United States Patent
Changlani et al.

(10) Patent No.: US 11,405,790 B2
(45) Date of Patent: Aug. 2, 2022

(54) SYSTEM AND METHOD TO PARTITION RADIO SPECTRUM IN A MIXED CLIENT ENVIRONMENT FOR EFFICIENT 802.11AX TRANSMISSIONS

(71) Applicant: HEWLETT PACKARD ENTERPRISE DEVELOPMENT LP, Houston, TX (US)

(72) Inventors: Nitin Changlani, Santa Clara, CA (US); Sachin Ganu, Santa Clara, CA (US)

(73) Assignee: Hewlett Packard Enterprise Development LP, Houston, TX (US)

( * ) Notice: Subject to any disclaimer, the term of this patent is extended or adjusted under 35 U.S.C. 154(b) by 62 days.

(21) Appl. No.: 16/912,664

(22) Filed: Jun. 25, 2020

(65) Prior Publication Data
US 2021/0409957 A1     Dec. 30, 2021

(51) Int. Cl.
*H04W 16/02* (2009.01)
*H04W 72/04* (2009.01)
*H04W 84/12* (2009.01)

(52) U.S. Cl.
CPC ....... *H04W 16/02* (2013.01); *H04W 72/0453* (2013.01); *H04W 84/12* (2013.01)

(58) Field of Classification Search
USPC ......................................................... 370/329
See application file for complete search history.

(56) References Cited

U.S. PATENT DOCUMENTS

| | | | | |
|---|---|---|---|---|
| 2003/0171115 A1* | 9/2003 | Batra | ..................... | H04W 16/02 455/434 |
| 2004/0121749 A1* | 6/2004 | Cui | ..................... | H04W 72/085 455/418 |
| 2004/0125779 A1* | 7/2004 | Kelton | .................. | H04W 72/12 370/347 |
| 2009/0213801 A1* | 8/2009 | Bejerano | ............... | H04W 28/16 370/329 |
| 2015/0271829 A1* | 9/2015 | Amini | .................. | H04W 24/02 370/329 |
| 2020/0303833 A1* | 9/2020 | Ueda | ........................ | H01Q 3/36 |

* cited by examiner

*Primary Examiner* — Gregory B Sefcheck
*Assistant Examiner* — Majid Esmaeilian
(74) *Attorney, Agent, or Firm* — Sheppard Mullin Richter & Hampton LLP

(57) ABSTRACT

Systems and methods for partitioning radio spectrum in an AP to support a mixed client environment while maintaining efficient 802.11ax transmissions is provided. Clients in a zone may be categorized into 802.11ax and legacy clients, and those clients may further be categorized into a majority population and a minority population. Assignment of the minority and majority populations can be effectuated by considering the number of available channels to be assigned to each population of client devices, as well as steering load/cost and a client device's ability to be steered to another channel. Moreover, assignment of the minority and majority populations can take into account maintaining a particular client-channel density.

20 Claims, 7 Drawing Sheets

SYSTEM AND METHOD TO PARTITION RADIO SPECTRUM IN A MIXED CLIENT ENVIRONMENT FOR EFFICIENT 802.11AX TRANSMISSIONS

DESCRIPTION OF RELATED ART

Wireless digital networks are becoming ubiquitous in enterprises, providing secure and cost-effective access to resources. Those networks usually have one or more controllers, each controller supporting a plurality of access points (AP) deployed through the enterprise. Wi-Fi networks operating in accordance with IEEE 802.11 standards are examples of such networks. Wireless network communications devices (also referred to as stations or client devices), such as personal computers and mobile phones transmit data across wireless digital networks vis-à-vis Wi-Fi APs, and cellular network APs, for example.

Wireless local area network (WLAN) infrastructure elements or components in a Wi-Fi network provide service to WLAN devices. In providing this service, radio frequency (RF) characteristics of the links between the AP and client devices may be determined in order to optimize the transmission and/or reception of data. These RF characteristics can include, for example, path loss and channel coefficients.

BRIEF DESCRIPTION OF THE DRAWINGS

The present disclosure, in accordance with one or more various embodiments, is described in detail with reference to the following figures. The figures are provided for purposes of illustration only and merely depict typical or example embodiments.

Figure 1:
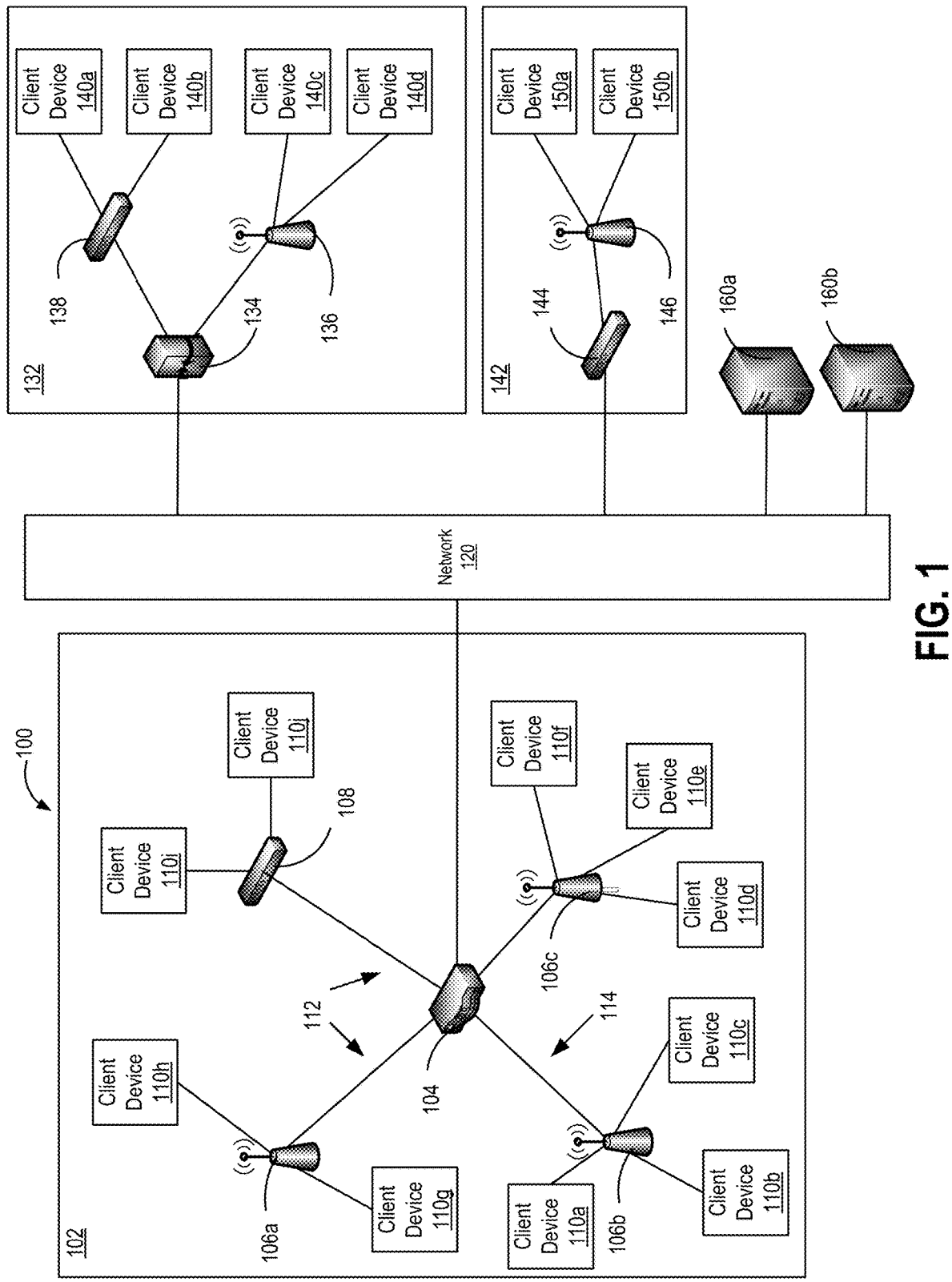
FIG. 1 illustrates one example of a network configuration that may be implemented for an organization, such as a business, educational institution, governmental entity, healthcare facility or other organization.

The figures are not exhaustive and do not limit the present disclosure to the precise form disclosed.

DETAILED DESCRIPTION

The 802.11ax standard provides for certain enhancements to WLAN networks. However, these enhancements may not be optimally leveraged when a WLAN network includes legacy (802.11a/b/g/n/ac) devices. This is because legacy devices or clients are unable to take full advantage of multi-user transmission techniques, e.g., orthogonal frequency division multiple access (OFDMA), and must contend for access to a medium to transmit/receive data in a sequential manner.

In an enterprise WLAN network, multiple basic service sets (BSSs) can be harnessed to cluster WLAN device in different BSS networks. It should be noted that according to the 802.11 standard, a service set or extended service set (ESS) can refer to a group of wireless network devices that are identified by the same service set identifier (SSID) or "network name." A BSS can refer to a subgroup of devices with a service set that (in addition to operating on the same level 2 networking parameters to form a logical network) operate within the same physical layer medium access characteristics, e.g., RF, modulation scheme, security settings, etc. such that they are wirelessly networked. Thus, in an enterprise WLAN network, multiple BSSs can be controlled such that network devices can be clustered in different BSS networks.

Also, certain APs can be converted or configured to operate according to different modes, e.g., single-radio or multi-radio modes. It should be understood that in single-radio mode, a single radio operates on a given band, whereas in a multi-radio mode, such a dual-radio mode, the radio chains of a radio can be grouped while operating on a given band. Other examples may be described in the context of APs that operate with yet another radio/group of radio chains operating on another given band. For example, an AP may be configured to operate using logical or physical radios. e.g., a 2.4 GHz radio and two 5 GHz radios. That is, a network device, such as an AP can use a radio chain to transmit and/or receive information via a network. As used herein, the term "radio chain" can refer to hardware that can transmit and/or receive information via radio signals. Wireless client devices and/or other wireless devices can communicate with a network device on a communication channel using multiple radio chains. As used herein, the term "communication channel" (or channel) can refer to a frequency or frequency range utilized by a network device to communicate (e.g., transmit and/or receive) information. A multiple input multiple output (MIMO) network device can use multiple radio chains to transmit and/or receive information. A radio chain can include two antennas such as a horizontal antenna and a vertical antenna, among other possibilities. As used herein, the term "antenna" refers to a device that converts electric power into radio waves, and/or vice versa.

As alluded to above, the 802.11ax standard provides for different wireless capabilities as compared to capabilities of earlier released (i.e., legacy) wireless standards, although when a WLAN network includes legacy client devices, the 802.11ax enhancements may not be realized, or at least fully realized.

Accordingly, various embodiments are directed to efficient channel assignment when an AP is operating in a multi-radio mode, e.g., dual-radio mode or tri-radio mode, where communication channels are split. For instance, communication channels on a communication band (e.g., the 5.0-7.0 GHz UNII band) can be split into a first communication channel group associated with a first radio to operate in accordance with a particular wireless standard/specification and a second communication channel group associated with a second radio to operate in accordance with other wireless standards/specifications, as described herein.

Thus, when operating in or when it is decided that a network device such as an AP is to move to operating in a multi-radio mode, a client device profile may be determined to identify majority and minority client device populations.

Then, a determination can be made as to which radio of a multi-radio AP may be used to serve the majority population and which radio may be used to serve the minority population. Regarding the actual assignment of a channel to client devices, care should be taken to avoid overlapping BSSs. Moreover, the radios of an AP can be configured to adapt to client patterns over time, and handle channel assignment for radios such that 802.11ax and legacy client devices can be relegated to their own portion(s) of the spectrum in an efficient manner.

Before describing embodiments of the disclosed systems and methods in detail, it is useful to describe an example network installation with which these systems and methods might be implemented in various applications. FIG. 1 illustrates one example of a network configuration 100 that may be implemented for an organization, such as a business, educational institution, governmental entity, healthcare facility or other organization. This diagram illustrates an example of a configuration implemented with an organization having multiple users (or at least multiple client devices 110) and possibly multiple physical or geographical sites 102, 132, 142. The network configuration 100 may include a primary site 102 in communication with a network 120. The network configuration 100 may also include one or more remote sites 132, 142, that are in communication with the network 120.

The primary site 102 may include a primary network, which can be, for example, an office network, home network or other network installation. The primary site 102 network may be a private network, such as a network that may include security and access controls to restrict access to authorized users of the private network. Authorized users may include, for example, employees of a company at primary site 102, residents of a house, customers at a business, and so on.

In the illustrated example, the primary site 102 includes a controller 104 in communication with the network 120. The controller 104 may provide communication with the network 120 for the primary site 102, though it may not be the only point of communication with the network 120 for the primary site 102. A single controller 104 is illustrated, though the primary site may include multiple controllers and/or multiple communication points with network 120. In some embodiments, the controller 104 communicates with the network 120 through a router (not illustrated). In other embodiments, the controller 104 provides router functionality to the devices in the primary site 102.

A controller 104 may be operable to configure and manage network devices, such as at the primary site 102, and may also manage network devices at the remote sites 132, 134. The controller 104 may be operable to configure and/or manage switches, routers, access points, and/or client devices connected to a network. The controller 104 may itself be, or provide the functionality of, an access point.

The controller 104 may be in communication with one or more switches 108 and/or wireless Access Points (APs) 106a-c. Switches 108 and wireless APs 106a-c provide network connectivity to various client devices 110a-j. Using a connection to a switch 108 or AP 106a-c, a client device 110a-j may access network resources, including other devices on the (primary site 102) network and the network 120.

Examples of client devices may include: desktop computers, laptop computers, servers, web servers, authentication servers, authentication-authorization-accounting (AAA) servers, Domain Name System (DNS) servers, Dynamic Host Configuration Protocol (DHCP) servers, Internet Protocol (IP) servers, Virtual Private Network (VPN) servers, network policy servers, mainframes, tablet computers, e-readers, netbook computers, televisions and similar monitors (e.g., smart TVs), content receivers, set-top boxes, personal digital assistants (PDAs), mobile phones, smart phones, smart terminals, dumb terminals, virtual terminals, video game consoles, virtual assistants, Internet of Things (IOT) devices, and the like.

Within the primary site 102, a switch 108 is included as one example of a point of access to the network established in primary site 102 for wired client devices 110i-j. Client devices 110i-j may connect to the switch 108 and through the switch 108, may be able to access other devices within the network configuration 100. The client devices 110i-j may also be able to access the network 120, through the switch 108. The client devices 110i-j may communicate with the switch 108 over a wired 112 connection. In the illustrated example, the switch 108 communicates with the controller 104 over a wired 112 connection, though this connection may also be wireless.

Wireless APs 106a-c are included as another example of a point of access to the network established in primary site 102 for client devices 110a-h. Each of APs 106a-c may be a combination of hardware, software, and/or firmware that is configured to provide wireless network connectivity to wireless client devices 110a-h. In the illustrated example, APs 106a-c can be managed and configured by the controller 104. APs 106a-c communicate with the controller 104 and the network over connections 112, which may be either wired or wireless interfaces.

The network 120 may be a public or private network, such as the Internet, or other communication network to allow connectivity among the various sites 102, 130 to 142 as well as access to servers 160a-b. The network 120 may include third-party telecommunication lines, such as phone lines, broadcast coaxial cable, fiber optic cables, satellite communications, cellular communications, and the like. The network 120 may include any number of intermediate network devices, such as switches, routers, gateways, servers, and/or controllers, which are not directly part of the network configuration 100 but that facilitate communication between the various parts of the network configuration 100, and between the network configuration 100 and other network-connected entities.

Figure 2:
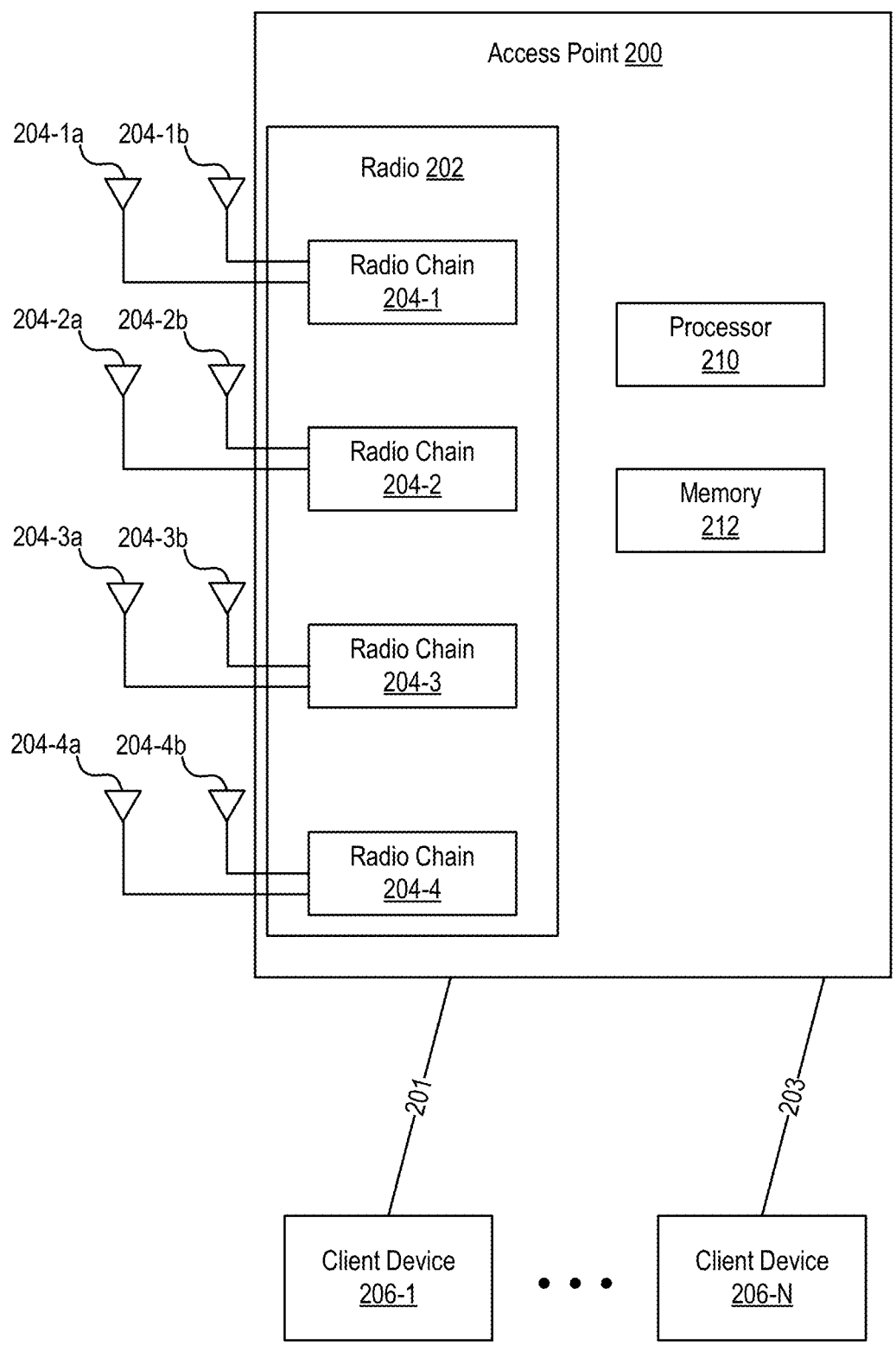
FIG. 2 illustrates an example access point within which various embodiments may be implemented.

FIG. 2 illustrates an example AP 200, which may be an embodiment of one of the APs of FIG. 1 (e.g., APs 106a-c). An AP can refer to a networking device that allows a wireless client device to connect to a wired or wireless network, and need not necessarily be limited to IEEE 802.11-based APs. An AP can include a processing resource, e.g., processor 210, a memory, e.g., memory 212, and/or input/output interfaces (not shown), including wired network interfaces such as IEEE 802.3 Ethernet interfaces, as well as wireless network interfaces such as IEEE 802.11 Wi-Fi interfaces, although examples of the disclosure are not limited to such interfaces.

AP 200 can include a plurality of antennas. AP 200 can include a radio 202 including four radio chains, 204-1, 204-2, 204-3, and 204-4, where each radio chain includes two antennas (204-1a, 204-1b. 204-2a, 204-2b, 204-3a, 204-3b, 204-4a, 204-4b). For instance, each radio chain can include a horizontal antenna and a vertical antenna, among other possibilities. As shown in FIG. 2, AP 200 can be a 4×4 multiple-inputs, multiple-outputs (MIMO) AP. Here, a 4×4 MIMO AP may have four radio chains (204-1, 204-2, 204-3, 204-4) with each radio chain available for both transmitting and receiving data. It should be understood that examples of the present disclosure are not so limited. For example, AP 200 can be a MIMO network device with smaller than a 4×4 antenna and radio chain configuration, or a MIMO network device with greater than a 4×4 antenna and radio chain configuration.

Although not shown in FIG. 2 for clarity and so as not to obscure examples of the present disclosure, each of the radio chains can be connected to the plurality of antennas 204-1*a* to 204-4*b* via a RF switch. In some examples, a first portion of the plurality of radio chains (e.g., radio chain 204-3 and 204-4) can be dedicated to a first communication channel 201 in the first communication channel group, where a second portion of the plurality of radio chains (e.g., 204-1 and 204-2) can be dedicated to a communication channel 203 in the second communication channel group. For instance, a total number of the plurality of radio chains can be equal to the sum of the first portion and the second portion of the plurality of radio chain, among other possibilities.

As mentioned, in some examples the communication band can be a 5.0-7.0 GHz UNII band. For example, communication channels (and mid-point frequencies) operating on the 5 GHz communication band can include 36 (5.180 GHz), 40 (5.200 GHz) 44 (5.220 GHz), and 149 (5.745 GHz), among others. In such examples, AP 200 can provide network connectivity to wireless client devices 206-1 on communication channel 201 (e.g., communication channel 36) included in a first communication channel group that is different from another communication channel 203 (e.g., communication channel 44) included in a second communication channel group that provides network connectivity to a different wireless client device such as wireless client device 206-N. That is, communication channel 201 is a communication channel that is different from communication channel 203. While illustrated as an individual communication channel it is understood that the first communication channel group and/or the second communication channel group can include a plurality of communication channels.

In some examples, the first communication channel group can include a plurality of communication channels with each communication channel of the plurality of communication channels is to operate on a communication band (e.g., 5.0-7.0 GHz UNII band) and operate in accordance with the particular wireless specification (e.g., 802.11ax). For example, by operating in accordance with the particular specification such as IEEE 802.11ax, each communication channel in the first communication channel group can more efficiently employ OFDMA, target wake time (TWT), spatial reuse, uplink multiuser multiple-input and multiple-output (UL MU-MIMO), and/or combinations thereof. By extension, a wireless client device having a capacity of complying with the particular wireless specification can, in such examples, have the capacity for employing OFDMA, TWT, spatial reuse, UL MU-MIMO, and/or combinations thereof.

Adoption of the 802.11ax standard amongst client devices relative to legacy client devices that comply with 802.11ac and older standards, in the beginning, may be small. However, as the technology matures from an interoperability perspective, the number of client devices compliant with 802.11ax will increase. In order to address this mix of client devices in an AP's operating environment, client devices may be clustered into majority and minority populations in accordance with one embodiment. These majority and minority populations (as will be described in greater detail below) can be assigned to different radios, e.g., a first 5 GHz radio and a second 5 GHz radio, of an AP.

In some embodiments, a low-bandpass filter may be used with one of the 5 GHz radios, and a high-bandpass filter may be used with the other of the 5 GHz radios. The result of using filters in this way is that effectively, one 5 GHz radio may use channels from the lower sub-band of the 5 GHz range portion of the spectrum while the other 5 GHz radio may use channels from the upper sub-band of the 5 GHz range portion of the spectrum. It should be understood that each channel in the 5 GHz band occupies a 20 MHz portion of the spectrum in this example, although channels may span, e.g., a 40, 60, 80, or 160 MHz frequency bands. In some embodiments, the lower sub-band of the 5 GHz band can be made up of eight 20 MHz channels (i.e., channels 36-64), while the upper sub-band can be made up of 17 20 MHz channels (i.e., channels 100-165). It should be understood that the present disclosure is not limited to splitting channels in the 5 GHz band in this manner, nor is the present disclosure limited to splitting channels in the 5 GHz band. For example, various embodiments contemplate application to the future 6 or 7 GHz modes of operation. It should also be understood that the quality of a given channel may or may not be the same across two radios, meaning that a given channel may be configurable on just one of the two 5 GHz radios, and the set of channels that can perform better on a radio may or may not be of the same size as another set of channels.

As noted above, a client profile of an AP may be determined in order to arrive at a particular deployment that can maintain separation between 802.11ax client devices and legacy client devices. A client profile can be determined relative to zones (or sub-zone levels if desired). As used herein, a "zone" can refer to an area where all APs can hear each other (belong to the same ESS). Typically, a zone can refer to a physical location having some set of APs within a larger deployment. For example, a zone may correspond to a building or a particular floor(s) within a building.

In a given zone of operation having some set of APs, an estimate of the average number of clients that are connected to each of the APs over a given period of time (for example, during a period of 24 hours) can be determined. The ratio of the number of 802.11ax clients to that (total) number of connected clients (referred to as the 11ax-client-ratio) can then be calculated. As noted above, a controller, such as controller 104 (FIG. 1), is operable to configure and manage network devices, such as APs, and may itself provide AP functionality (e.g., (AP 200 of FIG. 2). Thus, a controller may be configured to estimate the average total number of clients connected to each AP in a zone. Each AP connected to a client, based on communications with the client, can determine whether the client is 802.11ax-compliant or it if is a legacy client.

Table 1 (below) reflects possible client profiles in a given zone based on 802.11ax clients and legacy clients. It should be appreciated that when the 11ax-client-ratio is less than 50%, the 802.11ax clients make up a minority population, whereas when the 11ax-client ratio is greater than or equal to 50%, they make up the majority population. It should be noted that the 50% threshold is an example, and other embodiments contemplate other thresholds with which to categorize populations.

TABLE 1

| 11ax-client-ratio | majority-population | minority-population |
|---|---|---|
| Low (<50%) | Legacy clients (802.11ac and earlier) | 802.11ax clients |

TABLE 1-continued

| 11ax-client-ratio | majority-population | minority-population |
|---|---|---|
| High (>=50%) | 802.11ax clients | Legacy clients (802.11ac and earlier) |

Once the client profile of a zone has been determined, a determination as to which clients should move to which radio of an AP operating in dual-radio mode (i.e., dual-5 GHz radio mode) can be made. That is, a controller, e.g., controller 104, may map the minority population of clients to the lower sub-band radio of the AP (recalling that in some embodiments, the lower sub-band may have less channels, e.g., eight 20 MHz channels in the above-described dual-radio mode). Controller 104 may map the majority population of clients to the upper sub-band radio of the AP (recalling that in some embodiments, the upper sub-band may have more channels, e.g., 17 20 MHz channels). It should be noted that which sub-band has more/less channels than the other can depend on the particular network implementation/operating characteristics.

For example, for an AP operating in dual-5 GHz radio mode, the first 5-GHz radio can better support channels in the lower sub-band of the 5 GHz band (channels 36-48 (UNII-1), channels 52-64 (UNII-2a)) while the second 5 GHz radio can better support channels in the upper sub-band of the 5 GHz band (channels 100-144 (UNII-2c (Extended)) and channels 149-165(UNII-3)). Thus, upon the AP being converted into dual-5 GHz radio mode, e.g., at runtime, if the 11ax-client-ratio is less than a given threshold, e.g., 50%, the legacy clients will be steered to the second 5 GHz radio. If the 11ax-client-ratio is greater than or equal to 50%, the 802.11ax clients will be steered into the second 5 GHz radio under the same conditions. Table 2 (below) shows this client population-to-radio mapping.

TABLE 2

| 11ax-client-ratio | AP lower sub-band radio | AP upper sub-band radio |
|---|---|---|
| Low (<50%) | 802.11ax clients | Legacy clients (802.11ac and earlier) |
| High (>=50%) | Legacy clients (802.11ac and earlier) | 802.11ax clients |

Clustering client devices in this manner allows for a client-channel density value that is, at its worst, the same as if various embodiments for channel allocation were not applied. It should be understood that as used herein, "client-channel density" can refer to the ratio of the total number of clients connected to APs in a given zone across all channels to the total number of channels. That is, the minority population of clients being assigned to the radio with a smaller number of channels results in equivalent client-channel density than if the minority population of clients was assigned to the radio with the larger number of channels.

In some embodiments, rather than consider client-channel density, steering load or cost may be taken into account. Table 3 (below) summarizes various use case scenarios with corresponding clustering options.

TABLE 3

| | Case A | | Case B | | Case C | | Case D | |
|---|---|---|---|---|---|---|---|---|
| Previous home channel | 36 (lower sub-band) | | | | 100 (upper sub-band) | | | |
| Reference 11ax-client-ratio | <50% | | >=50% | | <50% | | >=50% | |
| Channels after conversion to multi-radio mode | 36 (lower sub-band, fewer channels) | 100 (upper sub-band, more channels) | 36 (lower sub-band, fewer channels) | 100 (upper sub-band, more channels) | 36 (lower sub-band, fewer channels) | 100 (upper sub-band, more channels) | 36 (lower sub-band, fewer channels) | 100 (upper sub-band, more channels) |
| Client-clustering Client population | 802.11ax clients minority | Legacy clients majority | Legacy clients minority | 802.11ax clients majority | 802.11ax clients minority | Legacy clients majority | Legacy clients minority | 802.11ax clients majority |
| Steering for clients to other channel | no | yes | no | yes | yes | no | yes | no |

It should be appreciated that for Case A and Case B, an AP may be operating in a single-radio mode, where some mixed population set of clients is assigned to channel 36 (5.180 GHz) of the lower sub-band of the 5 GHz band. It may be determined by a controller (or an AP) that the 11ax-client ratio within a given zone is less than 50% (Case A). Following the above client population-to-radio mapping scheme, the 802.11ax client devices may be assigned to channel 36 of the lower sub-band (which has fewer channels), and the legacy client devices (being the majority population) may be assigned to channel 100 of the upper sub-band (which has more channels). Because the 802.11ax client devices are in the minority amongst all client devices connected to APs in the given zone, they may remain on channel 36, and hence need not be steered to a new channel. On the other hand, the legacy clients which make up the majority of all clients in the given zone were originally assigned to channel 36 (of the lower sub-band). Subsequent to converting to dual-radio mode, the legacy clients are to be steered to channel 100 (of the upper sub-band). In Case B, where the 11ax-client-ratio is greater than or equal to 50%, the 802.11ax client devices must be steered to channel 100, while the legacy client devices remain on channel 36 (requiring no steering).

In Cases A and B, the majority population of client devices is steered to a new channel assignment making client-channel density considerations a priority over steering load or cost. It should be understood that "steering load" or "steering cost" can refer to the number of client devices to be steered from one radio to another radio to achieve desired clustering. It should also be understood that some client devices may not respond well to the protocol signaling applied to effectuate steering logic to move client devices from one channel (and radio) to another channel (and radio). Thus, a controller may be configured to prioritize maintaining client-channel density over steering load/cost and/or steering response. In the case of prioritizing steering response, the client population having a greater number of clients that do not respond well to steering may remain on its originally-assigned channel, when the AP was in single-radio mode. It should be understood that that the disclosed radio-client mapping logic/functionality may be implemented at a controller or an AP acting as a controller, and can apply to a particular "zone." The decision, if based on steering load, can be taken by cumulatively looking at the steering load on all APs controlled by the controller.

In contrast, for Cases C and D, steering considerations take precedence over client-channel density considerations, while still optimizing client-channel density and lowered steering load. That is, prior to conversion to dual-5 GHz radio mode, all client devices attached to an AP operating with a single radio may be assigned to one of the upper sub-band channels, e.g., channel 100. As reflected in Table 3, upon conversion of the AP to dual-radio mode, the majority population remains assigned to channel 100, and thus need not be steered, whereas the minority population of client devices, after conversion of the AP, are re-assigned to channel 36 (of the lower sub-band), thus necessitating that those client devices be steered to a new radio.

In terms of channel assignment, as alluded to above, a channel (or set of channels) to which 802.11ax clients are assigned can only be assigned to any other radio on another AP that is not dedicated to 802.11ax clients, if the radios from each AP form overlapping BSS (OBSS) networks. This can occur when another radio on another AP is not configured to be in dual-5 GHz mode, and may have a mixed population of 802.11ax and legacy clients, or if the decision-making for sub-zone radio-client mapping is being performed, and the OBSS AP is outside the sub-zone. It should be understood that this determination regarding provisioning can be performed at a controller level for a zone, and can be performed according to some periodicity, e.g., every 24 hours, based on the 802.11ax-client-ratio. At the controller level, it can be determined that radios tagged to serve 802.11ax clients do not get assigned the same channel as that for radios that are tagged to serve legacy clients.

In this way, a given channel is either completely reserved for 802.11ax clients or legacy clients, or has both kind of clients. In the latter scenario, the AP hasn't yet estimated or is still in the process of estimating whether it will support a particular client population. Thus, the number of legacy clients can be minimized for an AP radio that has a higher number of 802.11ax clients, and the AP radio will converge towards an almost-greenfield mode of operation (where an AP communicates, almost solely, with 802.11ax clients, maximizing the use of the high-efficiency features like MU-MIMO, OFDMA, TWT, etc.). This provides the channel conditions for optimized performance of the high-efficiency features of 802.11ax, i.e., without legacy clients, interference with 802.11ax clients will be minimized whenever the 802.11ax clients use the high-efficiency features specified in the 802.11ax standard/specification.

It should be noted that upon calculating a particular client-channel density within a given zone of operation, various embodiments ensure that the manner in which client devices are clustered do not skew the client-channel density value for 802.11ax and legacy client clusters by reserving more channels for 802.11ax clients than is necessarily needed. This in turn, can increase the client-channel density for radios supporting legacy clients. In accordance with some embodiments, this client-channel density metric may be monitored and considered when determining how many channels are to be reserved for the majority and minority populations. For example, a controller or a network management server may periodically calculate this metric. The rest of the channels can be used by the other APs that have mixed client populations that are not yet clustered.

Figure 3:
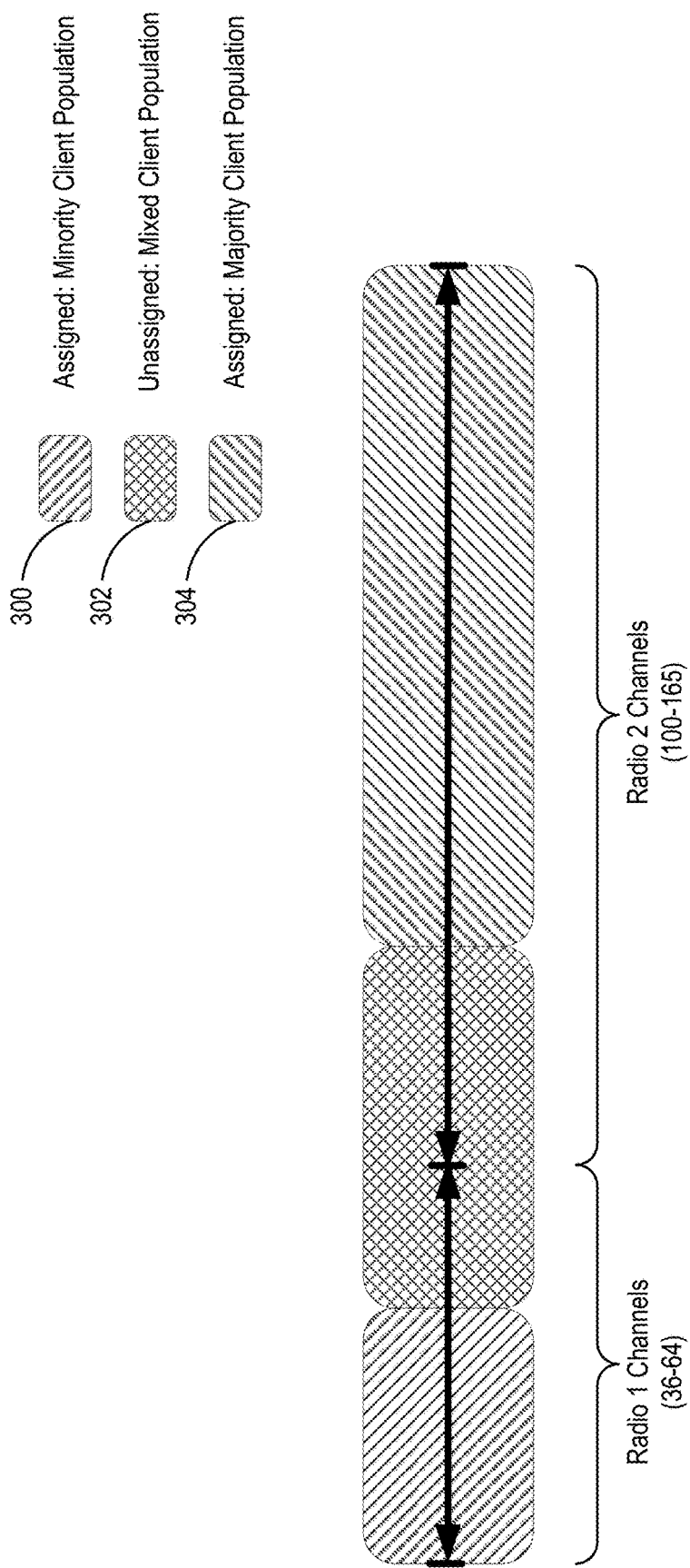
FIG. 3 is a representation of an example channel pool size distribution based on client-channel density in accordance with one embodiment.

FIG. 3 illustrates an example channel pool size distribution in accordance with one embodiment of the present disclosure. For example, consider that an AP, such as AP 200 is operating in dual 5 GHz radio mode, where a first radio, (radio 1) is operating with a 20 MHz channel bandwidth meaning that radio 1 (supporting the lower sub-band of the 5 GHz band) has eight channels (i.e., channels 36, 40, 44, 48, 52, 56, 60, and 64). The second radio (radio 2) supports the upper sub-band of the 5 GHz band, and thus has 17 channels (i.e., channels 100, 104, 108, 112, 116, 120 . . . 144, 149, 153, 157, 161, and 165). The total number of channels between both radio 1 and radio 2 is 25 channels. In an example scenario where a network's operating zone comprises 2500 clients, client-channel density is equal to 100 clients/channel. That is, the ratio of the total number of clients across all channels, i.e., 2500 in this example, to the total number of channels, e.g., 25 in this example, is 100 clients/channel. It should be understood that the 20 MHz band is merely an example, and channels may be, e.g., 40 MHz, 80 MHz, or 160 MHz channels.

If the 11ax-client-ratio is either 1750:750 or 750:1750, one possible distribution of channels would be as follows. Upon determining the client profile (the majority and minority populations of clients), a determination can be made to cluster the minority population to the lower sub-band radio (radio 1) and to cluster the majority population to the upper sub-band radio (radio 2). Assuming maintaining client-channel density is a priority, a determination may be made to assign 1500 clients out of the 1750 clients in the majority population to 15 channels of the 17 upper sub-band channels of radio 2. This corresponds to assignment 304 of FIG. 3. In this way, the client-channel density of 100 clients/channel in this particular AP operating with radios 1 and 2, can be maintained (1500 client devices across 15 channels equates to 100 clients/channel). Similarly, a determination may be made to assign 500 clients out of the 750 clients in the minority population to 5 channels of the 8 available channels of radio 1. This corresponds to assignment 300 of FIG. 3. In this way, again, the client-channel density of 100 clients/channel in this AP can be maintained (500 client devices across 5 channels equates to 100 clients/channel). Such a channel distribution leaves 500 clients unassigned to a particular channel of either radio 1 or radio 2. Thus, in accordance with one embodiment, the remaining 5 channels can be left unassigned, and used to support a mixed client population. This corresponds to assignment 302. It should be understood that any change to the 11ac-client-ratio and/or to the zone level may cause some or all of these channels to be shifted for use in supporting either the majority or minority population. It should be noted that there need not necessarily be any order regarding assignment (lowest-highest, highest-lowest, or other order) of channels to client populations. In other words, FIG. 3 (as well as FIGS. 4 and 5) illustrate the portion of the spectrum that will be assigned, rather than actual channels, per se.

It should be understood that the above-described example assumes that all radios in the operating zone can hear each other, and therefore, require separate channels, to avoid interfering with each other. That is, when a station, e.g., AP or client device, has a message to send, it must wait for the channel to which it is assigned to clear. When channels overlap, any station(s) on those channels can transmit regardless of what is occurring on other channels (referred to as adjacent channel interference), causing performance degradation. If the APs in a particular zone or zone level are not able to hear each other, then dedicated channels can also be reused for mixed mode operation since they do not overlap. Such logic can extend to cases where the channels assigned for a given population-type can cross the sub-band boundary for a given radio. This type of channel distribution can be effectuated so that an AP can conform to the client-channel density of the zone or lower it.

Figure 4:
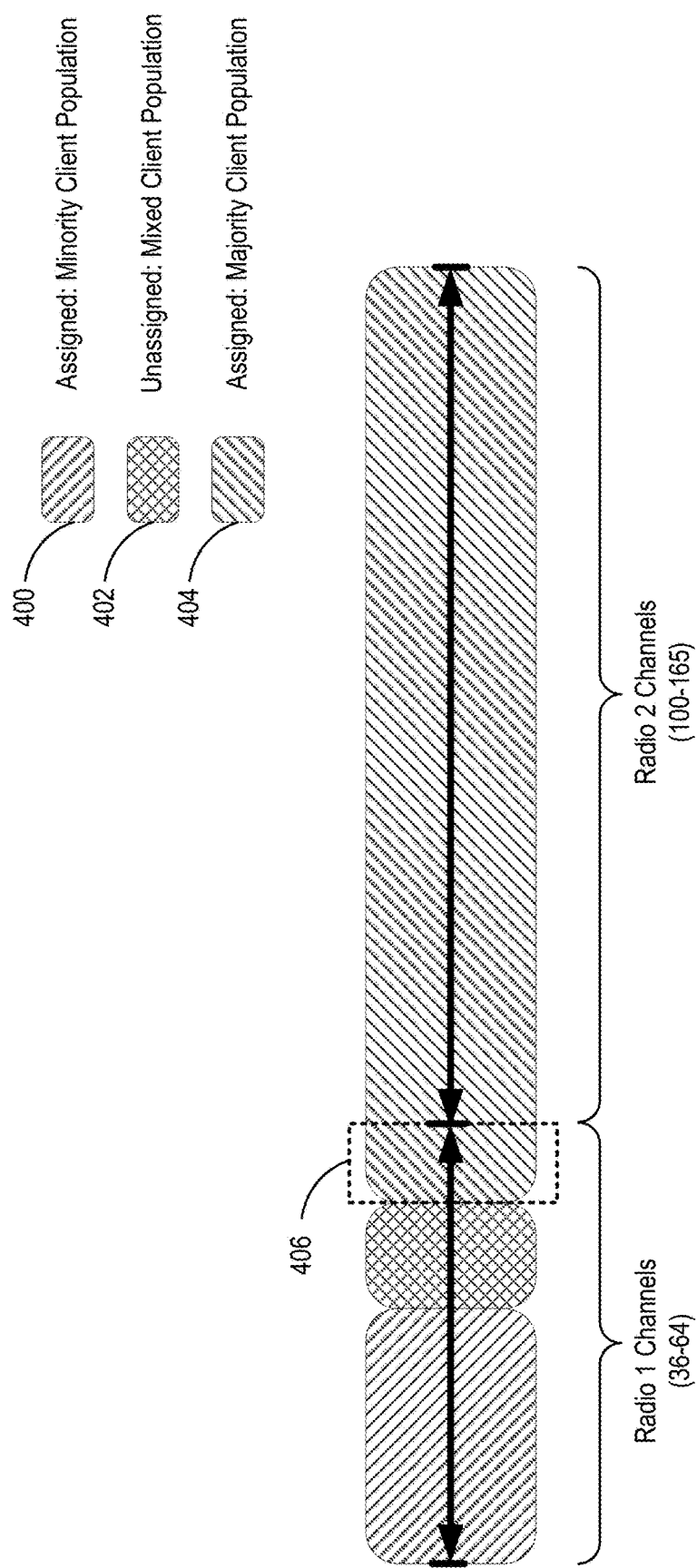
FIG. 4 is a representation of an example channel pool size distribution based on client-channel density in accordance with another embodiment.
Figure 5:
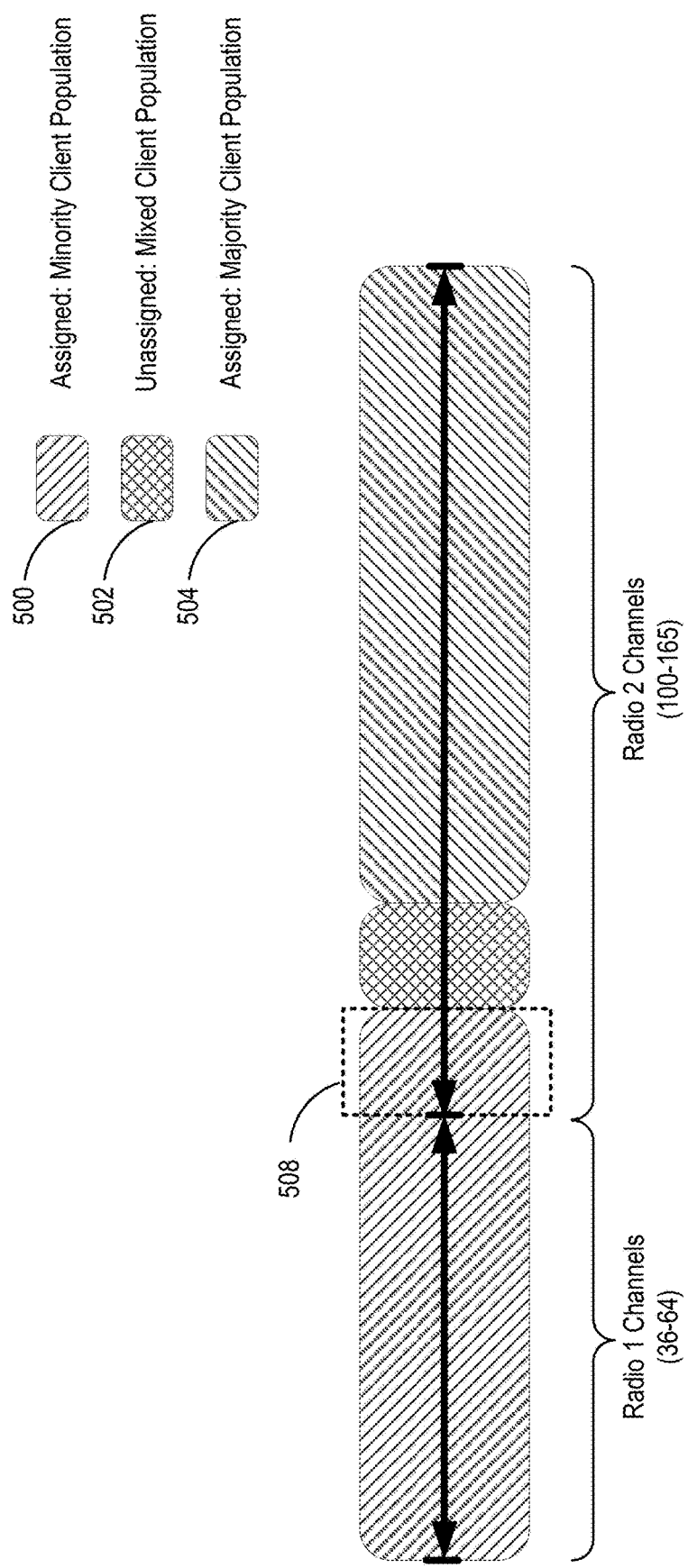
FIG. 5 is a representation of an example channel pool size distribution based on client-channel density in accordance with yet another embodiment.

In order to achieve the above-described scenario of sub-band boundary crossing, radios for certain APs in the zone can be earmarked for a particular population-type irrespective of whether they are in dual-5 GHz radio mode or not. FIGS. 4 and 5 illustrate example channel pool size distributions, where a majority population's channel pool size is extended or a minority population's channel pool size is extended, respectively.

Referring now to FIG. 4, consider a scenario where there are a total number of 2500 clients, and the 11ax-client-ratio is 1950:550 or 550:1950. To maintain a client-channel density of 100 clients/channel, the upper sub-band's 17 channels can all be allocated for clustering the majority population of client devices. As illustrated in FIG. 4, the radio 2 channels (100-165) are all assigned to the majority population of client devices. This corresponds to assignment 404. The majority population of client devices will also be assigned for use, two channels from the lower sub-band's eight available channels. This corresponds to assignment 406. This is because, it would not be possible to maintain a client-channel density of 100 clients/channel across 17 channels if 1950 client devices must be supported. It should be noted that these "extra" channels might be set on either a lower sub-band radio in a dual-radio mode AP, or the only 5 GHz radio in a single-radio mode AP. As noted above, APs may comprise radios operating over different frequency ranges, where dual- and single-radio mode refers to radio modes relative to a single, given band. The minority population of client devices will still be assigned to five channels from the lower sub-band. This corresponds to assignment 400. The sole remaining unassigned channel may be used for mixed mode operation. This corresponds to assignment 402. The assumption that all radios in the operating zone can hear each other (described above) applies to this scenario as well. That is, dedicated channels can also be reused for mixed mode operation if they do not overlap.

Referring now to FIG. 5, if the 11ax-client-ratio is 1050:1450 or 1450:1050, and a client-channel density of 100 clients/channel is to be maintained, the lower sub-band's eight channels are all allocated for clustering the minority population. This corresponds to assignment 500. The minority population will also use two channels from the upper sub-band. This corresponds to assignment 508. It should be understood that these channels might be set on either upper sub-band radios in a dual-radio mode AP, or the only 5 GHz radio on a single-radio mode AP. As noted above, APs may comprise radios operating over different frequency ranges, where dual- and single-radio mode refers to radio modes relative to a single, given band. The majority population will still have 14 channels from the upper sub-band to which clients in the majority population can be assigned. This corresponds to assignment 304. The sole remaining channel may be used for mixed mode operation. This corresponds to assignment 302. The assumption that all radios in the operating zone can hear each other also applies here as well.

Figure 6:
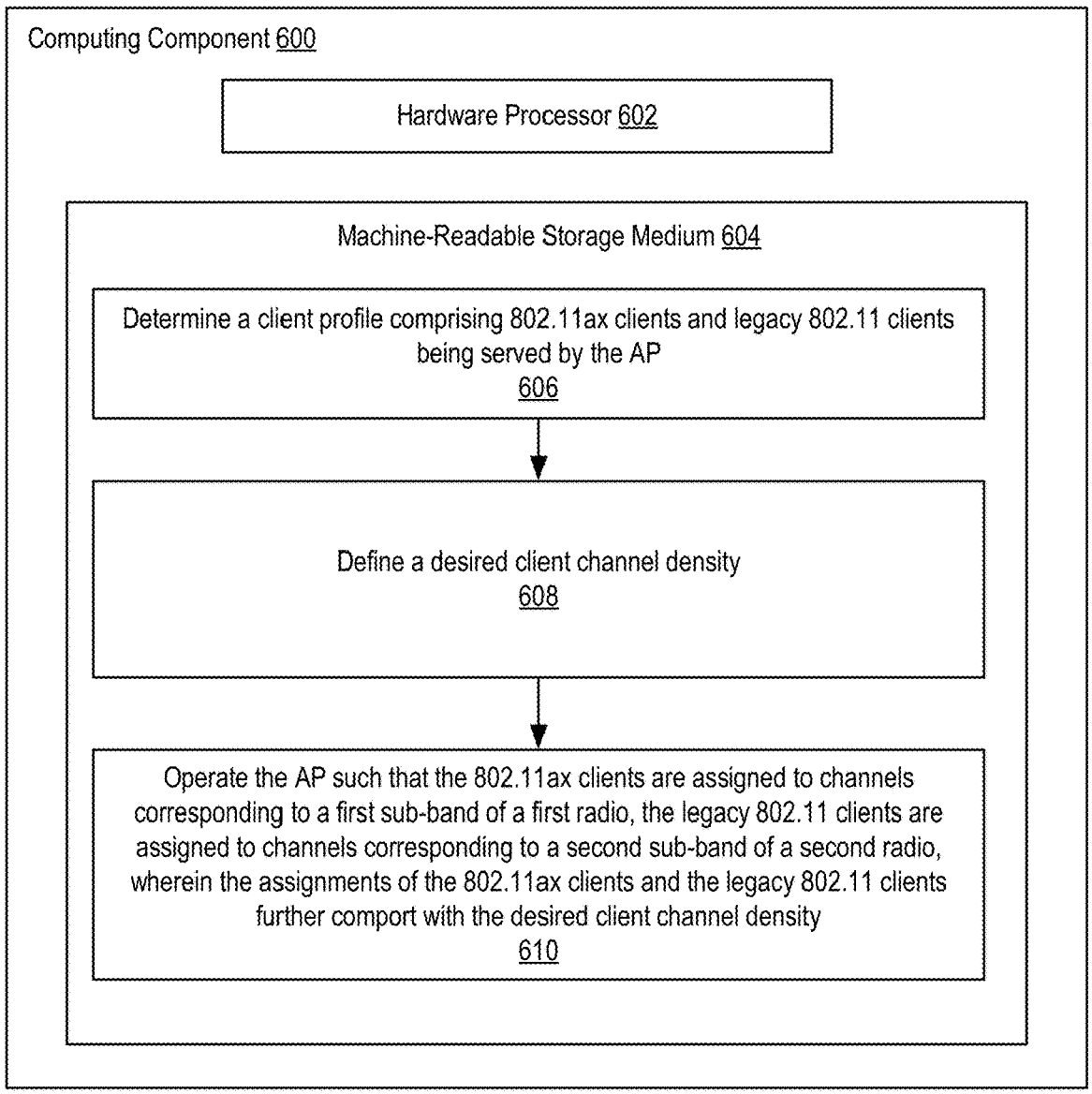
FIG. 6 is a block diagram of an example computing component or device for clustering client devices according to a radio spectrum partition in accordance with one embodiment.

FIG. 6 is a block diagram of an example computing component or device 600 for separating radio chains between mission-critical devices and enterprise clients in accordance with one embodiment. Computing component 600 may be, for example, a server computer, a controller, or any other similar computing component capable of processing data. In the example implementation of FIG. 6, the computing component 600 includes a hardware processor, 602, and machine-readable storage medium, 604. In some embodiments, computing component 600 may be an embodiment of an AP or AP controller, e.g., AP 200, respectively, or a component of network 120 of FIG. 1, for example. More particularly, computing component 600 may be a component of a central entity such as wireless mobility controller in the network.

Hardware processor 602 may be one or more central processing units (CPUs), semiconductor-based microprocessors, and/or other hardware devices suitable for retrieval and execution of instructions stored in machine-readable storage medium, 604. Hardware processor 602 may fetch, decode, and execute instructions, such as instructions 606-610, to control processes or operations for generating and transmitting the composite radio signal 330. As an alternative or in addition to retrieving and executing instructions, hardware processor 602 may include one or more electronic circuits that include electronic components for performing the functionality of one or more instructions, such as a field programmable gate array (FPGA), application specific integrated circuit (ASIC), or other electronic circuits.

A machine-readable storage medium, such as machine-readable storage medium 604, may be any electronic, magnetic, optical, or other physical storage device that contains or stores executable instructions. Thus, machine-readable storage medium 604 may be, for example, Random Access Memory (RAM), non-volatile RAM (NVRAM), an Electrically Erasable Programmable Read-Only Memory (EEPROM), a storage device, an optical disc, and the like. In some embodiments, machine-readable storage medium 602 may be a non-transitory storage medium, where the term "non-transitory" does not encompass transitory propagating signals. As described in detail below, machine-readable storage medium 602 may be encoded with executable instructions, for example, instructions 606-610.

Hardware processor 602 may execute instruction 606 to determine a client profile comprising 802.11ax clients and legacy 802.11 clients being served by an AP. As described above, a client profile may be determined by grouping 802.11ax clients and grouping legacy clients. One of these client groups will be designated or will represent a majority population, while the other of these client groups will be designated or will represent a minority population. Typically, the majority population will be assigned to channels of a sub-band radio having the greater number of channels (in a multi-radio AP or network device), while the minority population will be assigned to channels of a sub-band radio with less channels.

Hardware processor 602 may execute instruction 608 to define a desired client-channel density. As discussed above, it may be desirable to maintain a particular client-channel density which represents the number of clients per channel across a zone of operation.

Hardware processor 602 may execute instruction 610 to operate the AP such that the 802.11ax clients are assigned to channels corresponding to a first sub-band of a first radio, the legacy 802.11 clients are assigned to channels corresponding to a second sub-band of a second radio, wherein the assignments of the 802.11ax clients and the legacy clients further comport with the desired client-channel density. As described above, APs can be divided into one 5 GHz radio or dual 5 GHz radios—either of them existing in addition to one 2.4 GHz radio. In accordance with various embodiments, some number of clients in a zone can be assigned to one or more channels of an upper sub-band radio and to one or more channels of a lower sub-band radio so that across all APs in the zone, the client-channel density can at least be maintained. It should be noted that in some embodiments, optimizing channel distribution and client device clustering can prioritize other considerations, e.g., steering load/cost and ability of client devices to be steered. For example, some configurations may be determined to minimize steering cost, whereas other configurations may incur large steering cost, but client-channel density can nonetheless be, at least, maintained. Further still, some client device clustering and AP radio channel assignment distribution can involve dedicating one or more channels of a radio otherwise assigned to one client population, to the other client population. That is, one or more channels of a lower sub-band radio may be assigned for use by the majority population clients, or one or more channels of an upper sub-band radio may be assigned for use by the minority population clients. Recall that the lower sub-band radio typically has less available channels than the upper sub-band radio. Thus, typically, the majority population of client devices is assigned to the upper sub-band radio, while the minority population of client devices is assigned to the lower sub-band radio. However, which sub-band has the greater number of channels can differ depending on a particular implementation.

Using the three methods described herein (determining a radio distribution between 802.11ax and legacy clients, assigning channels to avoid overlapping BSS networks, and determining a proper channel pool size), various embodiments are able to cleanly separate 802.11ax and legacy/non-802.11ax clients into their own spectrum chunks in an efficient manner. It should be understood that the above-described operations can be repeated periodically to account for any changes in client device demographics in a given RF zone over time.

Figure 7:
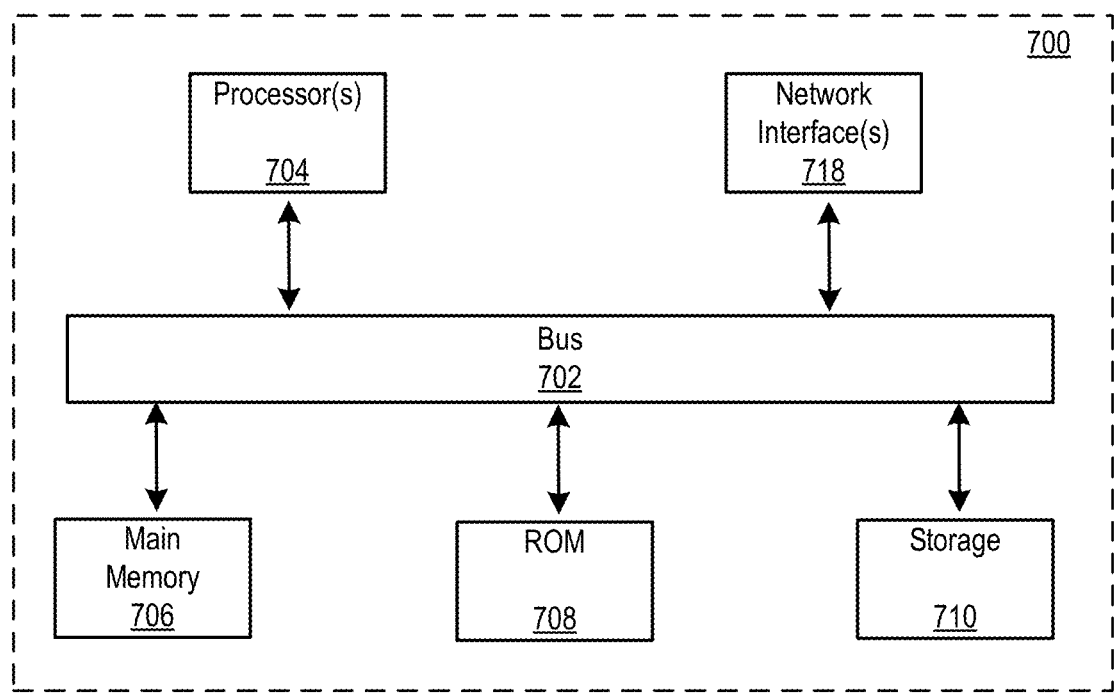
FIG. 7 depicts a block diagram of an example computer system in which various of the embodiments described herein may be implemented.

FIG. 7 depicts a block diagram of an example computer system 700 in which various of the embodiments described herein may be implemented. The computer system 700 includes a bus 702 or other communication mechanism for communicating information, one or more hardware processors 704 coupled with bus 702 for processing information. Hardware processor(s) 704 may be, for example, one or more general purpose microprocessors.

The computer system 700 also includes a main memory 706, such as a random access memory (RAM), cache and/or other dynamic storage devices, coupled to bus 702 for storing information and instructions to be executed by processor 704. Main memory 706 also may be used for storing temporary variables or other intermediate information during execution of instructions to be executed by processor 704. Such instructions, when stored in storage media accessible to processor 704, render computer system 700 into a special-purpose machine that is customized to perform the operations specified in the instructions.

The computer system 700 further includes a read only memory (ROM) 708 or other static storage device coupled to bus 702 for storing static information and instructions for processor 704. A storage device 710, such as a magnetic disk, optical disk, or USB thumb drive (Flash drive), etc., is provided and coupled to bus 702 for storing information and instructions.

In general, the word "component," "system," "database," and the like, as used herein, can refer to logic embodied in hardware or firmware, or to a collection of software instructions, possibly having entry and exit points, written in a programming language, such as, for example, Java, C or C++. A software component may be compiled and linked into an executable program, installed in a dynamic link library, or may be written in an interpreted programming language such as, for example, BASIC, Perl, or Python. It will be appreciated that software components may be callable from other components or from themselves, and/or may be invoked in response to detected events or interrupts. Software components configured for execution on computing devices may be provided on a computer readable medium, such as a compact disc, digital video disc, flash drive, magnetic disc, or any other tangible medium, or as a digital download (and may be originally stored in a compressed or installable format that requires installation, decompression or decryption prior to execution). Such software code may be stored, partially or fully, on a memory device of the executing computing device, for execution by the computing device. Software instructions may be embedded in firmware, such as an EPROM. It will be further appreciated that hardware components may be comprised of connected logic units, such as gates and flip-flops, and/or may be comprised of programmable units, such as programmable gate arrays or processors.

The computer system 700 may implement the techniques described herein using customized hard-wired logic, one or more ASICs or FPGAs, firmware and/or program logic which in combination with the computer system causes or programs computer system 700 to be a special-purpose machine. According to one embodiment, the techniques herein are performed by computer system 700 in response to processor(s) 704 executing one or more sequences of one or more instructions contained in main memory 706. Such instructions may be read into main memory 706 from another storage medium, such as storage device 710. Execution of the sequences of instructions contained in main memory 706 causes processor(s) 704 to perform the process steps described herein. In alternative embodiments, hard-wired circuitry may be used in place of or in combination with software instructions.

The term "non-transitory media," and similar terms, as used herein refers to any media that store data and/or instructions that cause a machine to operate in a specific fashion. Such non-transitory media may comprise non-volatile media and/or volatile media. Non-volatile media includes, for example, optical or magnetic disks, such as storage device 710. Volatile media includes dynamic memory, such as main memory 706. Common forms of non-transitory media include, for example, a floppy disk, a flexible disk, hard disk, solid state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge, and networked versions of the same.

Non-transitory media is distinct from but may be used in conjunction with transmission media. Transmission media participates in transferring information between non-transitory media. For example, transmission media includes coaxial cables, copper wire and fiber optics, including the wires that comprise bus 702. Transmission media can also take the form of acoustic or light waves, such as those generated during radio-wave and infra-red data communications.

As used herein, the term "or" may be construed in either an inclusive or exclusive sense. Moreover, the description of resources, operations, or structures in the singular shall not be read to exclude the plural. Conditional language, such as, among others, "can," "could," "might," or "may," unless specifically stated otherwise, or otherwise understood within the context as used, is generally intended to convey that certain embodiments include, while other embodiments do not include, certain features, elements and/or steps.

Terms and phrases used in this document, and variations thereof, unless otherwise expressly stated, should be construed as open ended as opposed to limiting. As examples of the foregoing, the term "including" should be read as meaning "including, without limitation" or the like. The term "example" is used to provide exemplary instances of the item in discussion, not an exhaustive or limiting list thereof. The terms "a" or "an" should be read as meaning "at least one," "one or more" or the like. The presence of broadening words and phrases such as "one or more," "at least," "but not limited to" or other like phrases in some instances shall not be read to mean that the narrower case is intended or required in instances where such broadening phrases may be absent.

What is claimed is:

1. An access point (AP), comprising:
    a processor; and
    a memory unit operatively connected to the processor, the memory unit including instructions that when executed, cause the processor to:
        define a desired client-channel density of 802.11ax clients and legacy 802.11 clients being served by the AP, wherein the desired client-channel density is a ratio of a first number of 802.11ax clients and legacy 802.11 clients connected to the AP in a given zone across all channels to a second number of channels;
        determine a number of the 802.11ax clients and a number of the legacy 802.11 clients;
        assign the 802.11ax clients to the channels corresponding to a first sub-band of a first radio; and
        assign the legacy 802.11 clients to the channels corresponding to a second sub-band of a second radio, wherein the number of the 802.11ax clients or the number of the legacy 802.11 clients divided by the second number of channels comports with the desired client-channel density.

2. The AP of claim 1, wherein the instructions that when executed cause the processor to determine a client profile cause the processor to cluster either the 802.11ax clients or the legacy 802.11 clients as a majority population and cluster the other of the 802.11ax clients or the legacy 802.11 clients as a minority population.

3. The AP of claim 2, wherein the first radio comprises a first 5 GHz radio, and the second radio comprises a second 5 GHz radio.

4. The AP of claim 2, wherein the majority population cluster is assigned to either the first sub-band or the second sub-band depending on which of the first or second sub-bands comprises a greater number of channels.

5. The AP of claim 4, wherein the minority population cluster is assigned to the other of the first sub-band or the second sub-band depending on which of the first or second sub-bands comprises a smaller number of channels.

6. The AP of claim 5, wherein the memory unit includes instructions that when executed further cause the processor to determine steering cost associated with steering clients of either the majority population or the minority population to one of the first or second sub-bands.

7. The AP of claim 6, wherein the memory unit includes instructions that when executed further cause the processor to leave the majority population assigned to one of the first or second sub-bands comprising the greater number of channels to reduce steering cost.

8. The AP of claim 6, wherein the memory unit includes instructions that when executed further cause the processor to steer the minority population to one of the first or second sub-bands comprising the smaller number of channels to reduce steering cost.

9. The AP of claim 6, wherein the memory unit includes instructions that when executed further cause the processor to prioritize one of steering cost or client-channel density over the other.

10. The AP of claim 1, wherein the channels to which the 802.11ax clients are assigned are not assigned to any other radio in a radio frequency (RF) zone within which the AP operates that is not dedicated to servicing the 802.11ax clients.

11. The AP of claim 1, wherein the instructions that when executed cause the processor to operate the AP to comport with the desired client-channel density further causes the processor to operate the AP such that the desired client-channel density is constant across the first and second sub-bands of the first and second radios, respectively.

12. The AP of claim 11, wherein the memory unit includes instructions that when executed further cause the processor to define a channel pool size depending on the desired client-channel density such that a subset of the 802.11ax clients or legacy 802.11 clients are assigned to a supplementary subset of channels from the other of the first or second sub-band of the first or second radio, respectively.

13. An access point (AP), comprising:
    at least two radios operating across a plurality of channels in a given frequency band;
    a processor; and
    a memory unit operatively connected to the processor, the memory unit including instructions that when executed, cause the processor to:
        determine a number of 802.11ax clients and a number of legacy 802.11 clients being served by the AP;
        define a desired client-channel density of 802.11ax clients and legacy 802.11 clients being served by the AP, wherein the desired client-channel density is a ratio of the number of 802.11ax clients and legacy 802.11 clients connected to the AP across all channels to a second number of channels; and
        operate the AP such that the 802.11ax clients are assigned to a first sub-band of channels supported by a first radio of the at least two radios, the legacy 802.11 clients are assigned to a second sub-band of channels corresponding to a second radio of the at least two radios, wherein the assignments of the 802.11ax client and the legacy 802.11 clients further comport with at least one of the desired client-channel density and a steering cost.

14. The AP of claim 13, wherein the given frequency band comprises a frequency band within a range of frequency bands between 5.0 GHz and 7.0 GHz.

15. The AP of claim 13, wherein the memory unit includes instructions that when executed further cause the processor to cluster either the 802.11ax clients or the legacy 802.11 clients as a majority population and cluster the other of the 802.11ax clients or the legacy 802.11 clients as a minority population based on the number of the 802.11ax clients and the number of the legacy 802.11 clients.

16. The AP of claim 15, wherein the majority population is assigned to either the first sub-band of channels or the second sub-band of channels depending on which of the first or second sub-bands comprises a greater number of channels to achieve the desired client-channel density.

17. The AP of claim 15, wherein the minority population is assigned to the other of the first sub-band of channels or the second sub-band of channels depending on which of the first or second sub-bands comprises a smaller number of channels to achieve the desired client-channel density.

18. The AP of claim 13, wherein the memory unit includes instructions that when executed further cause the processor to determine the steering cost associated with steering clients of either the majority population or the minority population to one of the first or second sub-bands of channels.

19. The AP of claim 18, wherein the memory unit includes instructions that when executed further cause the processor to leave the majority population assigned to one of the first or second sub-bands of channels comprising the greater number of channels to reduce steering cost.

20. The AP of claim 13, wherein the memory unit includes instructions that when executed further cause the processor to steer the minority population to one of the first or second sub-bands of channels comprising the smaller number of channels to reduce steering cost.

* * * * *